United States Patent

[11] 3,622,005

| [72] | Inventor | Ken-Ichiro Kurita<br>Suita, Osaka, Japan |
|---|---|---|
| [21] | Appl. No. | 780,724 |
| [22] | Filed | Dec. 3, 1968 |
| [45] | Patented | Nov. 23, 1971 |
| [73] | Assignee | Kurita Machinery Manufacturing Company, Limited<br>Nishiku, Osaka, Japan |
| [32] | Priority | Nov. 5, 1968 |
| [33] | | Japan |
| [31] | | 43/80769 |

[54] APPARATUS FOR AUTOMATICALLY SHAKING FILTER CAKE IN A FILTER PRESS
6 Claims, 13 Drawing Figs.

[52] U.S. Cl. ................................................ 210/225
[51] Int. Cl. ................................................ B01d 25/32
[50] Field of Search .......................................... 210/225, 270; 100/198

[56] References Cited
UNITED STATES PATENTS

| 2,932,399 | 4/1960 | Emele | 210/225 |
| 3,289,844 | 12/1966 | Emele | 210/225 |
| 3,360,130 | 12/1967 | Kaga | 210/225 |
| 3,366,244 | 1/1968 | Kurita | 210/225 |
| 3,446,358 | 5/1969 | Kratochvil et al. | 210/230 |

*Primary Examiner*—Reuben Friedman
*Assistant Examiner*—T. A. Granger
*Attorney*—Wenderoth, Lind & Ponack ABSTRACT: A vibrating means above filter plates is adapted to be moved above a suspended rod hung with a filter cloth which is attached to filter plates. When the plates are moved one by one after the filtering operation, the rod is brought into vibration in operative relationship with the vibration of the filter plates so as to effect the vibration of the cloth when it is brought into an open position between a plate which has been moved and a remaining plate. The filter cake can be shaken from the cloth by the vibration.

KEN-ICHIRO KURITA,
*Inventor*

KEN-ICHIRO KURITA,
Inventor

KEN-ICHIRO KURITA,
Inventor

APPARATUS FOR AUTOMATICALLY SHAKING FILTER CAKE IN A FILTER PRESS

The present invention relates to an apparatus for automatically shaking filter cake in a filter press and more particularly to an apparatus in an automatic filter press for automatically shaking filter cake from filter cloth.

A filter press has already been proposed for example by U.S. Pat. Nos. 3,366,243 and 3,366,244 in which a central portion of a filter cloth is hung on a horizontal rod just above each two adjacent filter plates with the lower ends thereof fastened to the middle or the lower parts of sides of the plates facing to each other, so as to form an inverted V-shape when the adjacent plates are parted from each other to thereby get the cake removed from the filter cloth.

In case a liquid of low viscosity is treated by the above-mentioned filter press, the cake attached to the filter cloth can be removed by the above movements of the filter plates and filter cloth, but in case of a liquid of high viscosity, the cake is attached to the filter cloth in strong sticking engagement therewith, so that the cake can not be exfoliated readily. This is a disadvantage of the conventional filter press.

An object of the present invention is to automatically shake the cake from the filter cloth snugly stuck thereto by giving vibration to the cloth and thereby producing cracks or fractures in the cake when each of the filter plates are separated and moved upon finishing the filtration.

Another object of the present invention is to save the time required for removing the cake by providing a single vibrating means which is capable of effecting the vibration of the filter cloth simultaneously with the travel of a number of filter plates.

Other objects of the present invention will become apparent from the description of the embodiments of the apparatus and claims with reference to the accompanying drawings, in which:

Figure 1:
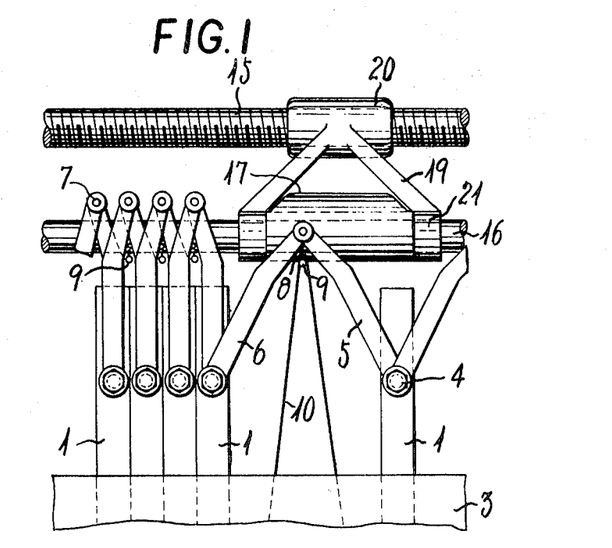
FIG. 1 is a front view of the principal parts of an embodiment.
Figure 2:
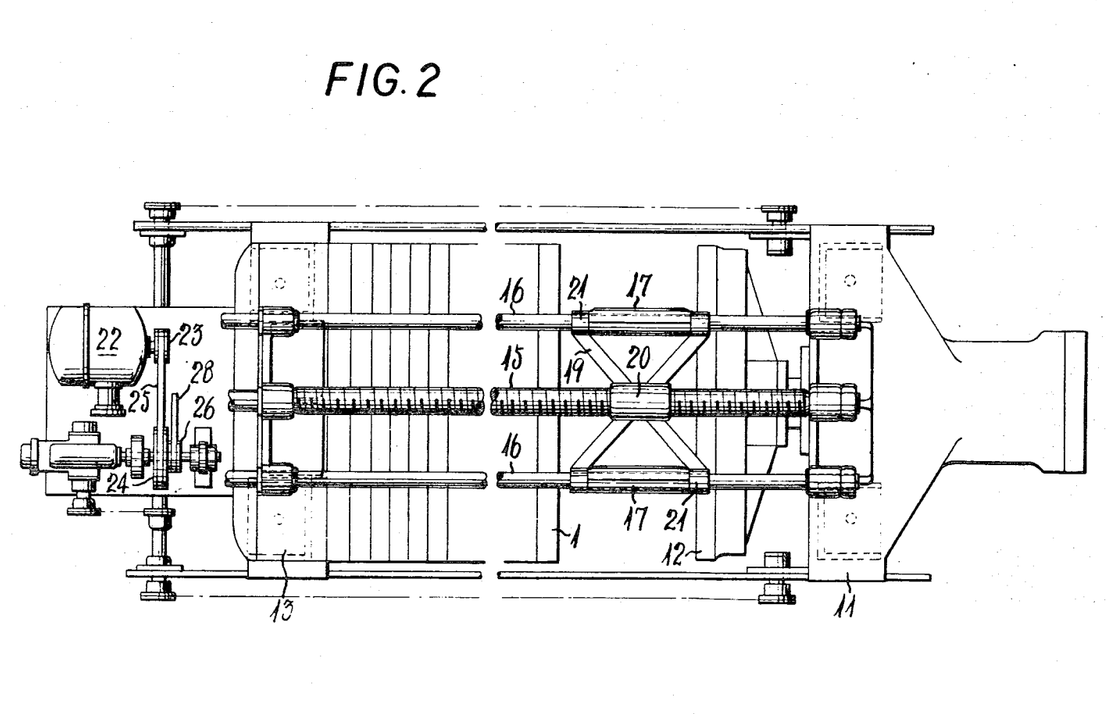
FIG. 2 is an overall plan view with a part omitted.
Figure 3:
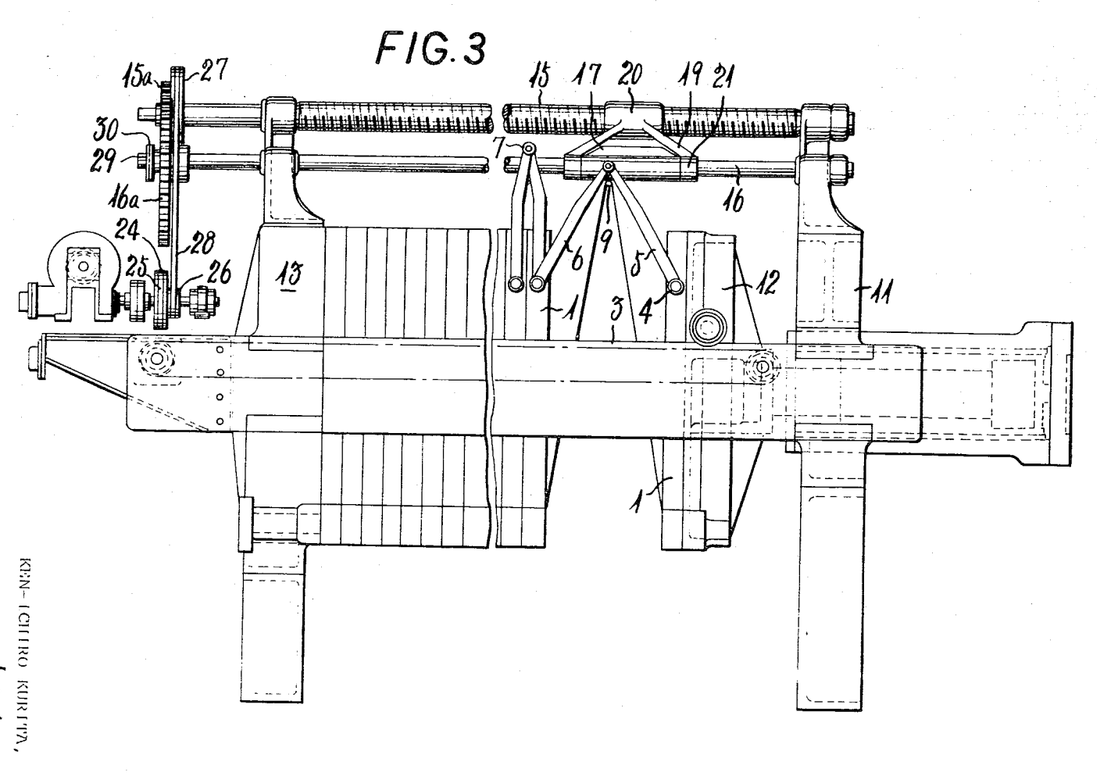
FIG. 3 is a front view of the same.
Figure 4:
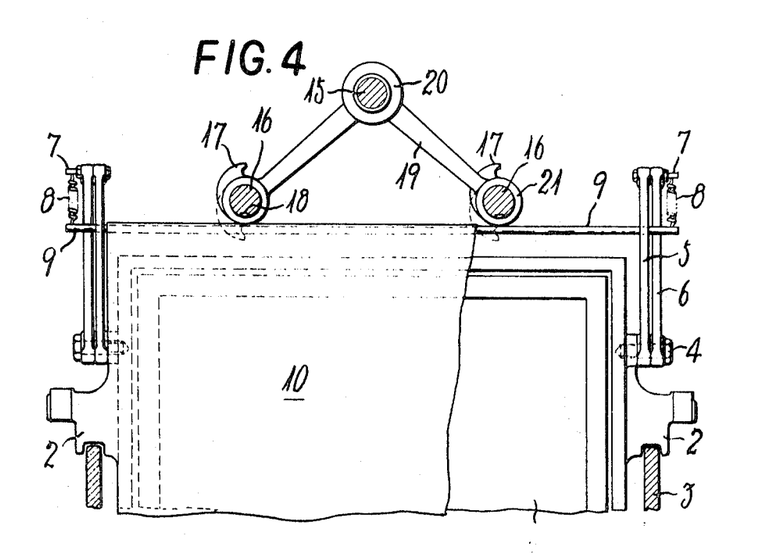
FIG. 4 is a vertical sectional side elevation of the embodiment as it is shown in FIG. 1.

Referring to FIGS. 1 to 3, the numeral 1 designates filter plates in a filter press which are arranged side by side and respectively supported at protruding members formed on opposite side edges by side rails 3. To the shoulders of each filter plate 1 are pivotally mounted links 5 and 6 by means of bolts 4. The top portions of the links 5 and 6 are connected together by means of a bolt 7 to which is linked a suspension spring 8. A rod 9 hangs horizontally from the spring 8.

As already known, a filter cloth 10 attached to the lower ends of adjacent filter plates is hung on the horizontal rod 9.

When each of the filter plates 1 is moved in the direction of the frame 13 on the left by a movable head 12, each piece of filter cloth 10 is brought into contact with both sides of the filter plate 1, and in this state, filtration is carried out. After the filtration has been finished, the movable head 12 is moved rightward as seen in the drawing and the filter plates 1 are then moved one by one toward the movable head 12. Since the automatic filter plate moving apparatus has already been known as, for example, in U.S. Pat. No. 3,331,511, the description of the apparatus will not be given herein.

It will be seen in FIGS. 2 and 3 that in the upper end middle portion of frames 11 and 13 is disposed a horizontal guide screw 15, and on the both sides of and slightly below the screw 15 are longitudinally provided two camshafts 16 which are supported on the frames 11 and 13. Each of the camshafts 16 is fitted with a cam 17 with an eccentric protrusion formed in the main cylindrical body. The cam 17 is provided with a key 18 in the shaft hole and thus adapted to be slidably moved on the cam shaft 16. Each of the cams 17 is mounted on the camshaft 16 between bushes 21 and 21 forming pairs thereon which are respectively connected to each end of links 19 X-shaped in plan view and attached to a movable member 20 mounted on the above-mentioned guide screw 15 in screw-thread engagement therewith. Thus, when the guide screw 15 is turned, the movable member 20 and cams 17 are sent forward along the shafts while the cams 17 are turned by cam shafts 16. The rotation of a motor 22 is delivered from a pulley 23 to pulley 24 through a belt 25 while it is being subjected to speed reduction and the torque is further transmitted from a pulley 26 which is coaxial with the pulley 24 to a pulley 27 fixed to an end of the guide screw 15 by means of a belt 28. The guide screw 15, when driven, sends the movable member 20 forward.

One end of the threaded rod 15 and one end of each camshaft 16 are brought into meshing engagement by means of gears 15a and 16a thereon to transmit the rotation from the rod 15 to the camshaft 16 while effecting deceleration. Furthermore, each of the camshafts 16 is fixedly provided with a chain 30 reeved therearound so as to drive each of the camshafts 16 at the same speed.

To move the movable member 20 leftward by the thickness of the filter plate when the filter plates 1 are successively mounted rightward after filtering operation has been finished, the relative ratio between the speed of the automatic filter-plate-moving apparatus (not shown) and that of the means for driving the movable member in the opposite direction is determined. While the filter plates are being moved, each of the cams 17 is always positioned above the rod 9 in a manner intersecting the same for hanging the filter cloth 10 which is disposed in an inverted V-shape between the plates and the camshafts 16 when driven cause the cams 17 to depress or release the rod 9, whereby the filter cloth is brought into vibration up and down to be cleared of the filter cake which is quite viscous and stuck to the filter cloth.

Modified embodiments of the invention are shown in FIGS. 5 to 13. In order to simplify the explanation, each part of the filter press in the embodiments in these drawings will be referred to by the same reference numbers as in FIGS. 1 to 4.

Figure 5:
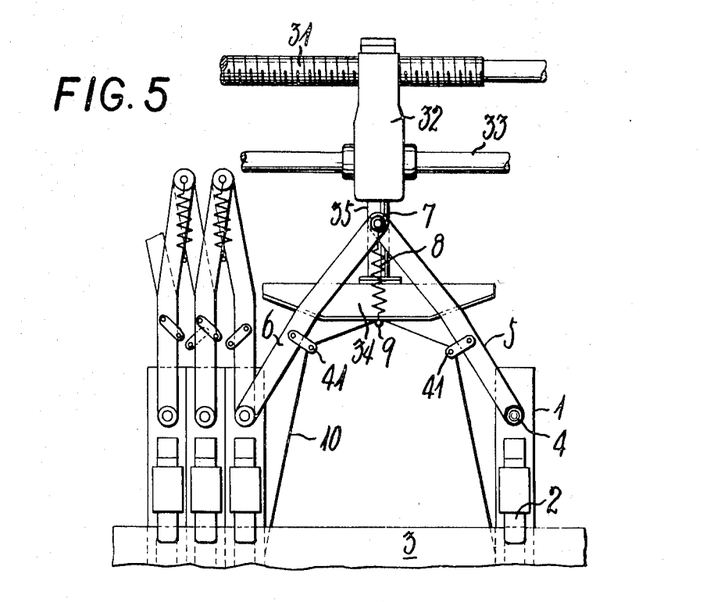
FIGS. 5 and 6 are a front view and a vertical sectional side elevation of a modified embodiment.
Figure 6:
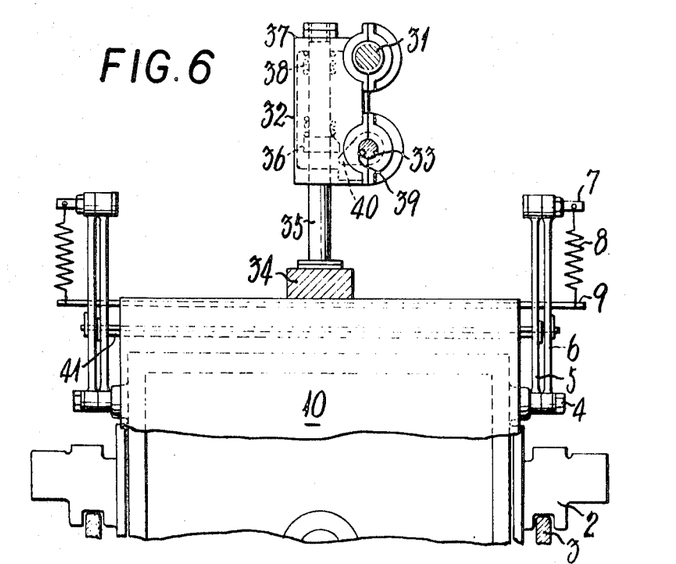

In an embodiment in FIGS. 5 and 6, there is disposed a vibration generator box 32 which is adapted to be moved in a direction opposite to that of the travel of the filter plates by a longitudinal guide screw 31 disposed above the middle of the filter plates 1. A camshaft 33 is extending through the lower portion of the box 32 in parallel with the guide screw 31. In the vibration generator box 32 is housed the upper half of a shaft 35 having a vibrating member 34 at the lower end, and within the vibration generator 32 between a hook member 36 fixed to the shaft 35 and the top plate 37 of the box 32 is disposed a coil spring 38 acting on the shaft 35. On the other hand, the vibration generator box 32 provides therein a cam 40 to be engaged with a key 39 of the camshaft 33. In FIGS. 5 and 6, the numeral 41 designates an intermediate rod for the filter cloth provided on the links 5 and 6.

In case the guide screw 31 is turned, the vibration generator box 32 is moved in a direction opposite to that of the rightward travel of the filter plates 1. Above the rod 9 on which the filter cloth 10 taking the form of an inverted V-shape as the filter plates 1 travel is hung, the cam 40 which is turned by the camshaft 33 pushes up the hook member 36 and the shaft 35 against the coil spring 38. When the cam 40 is moved out of engagement with the hook member 36, the shaft 35 and vibrating member 34, being urged by the coil spring 38, bring the filter cloth 10 on the suspended rod 9 into vibration in vertical direction, thus getting the cake stuck to the cloth removed therefrom. The guide screw 31 and camshaft 33 are of course driven by a transmitting means associated with the apparatus for automatically moving the filter plates 1.

Figure 7:
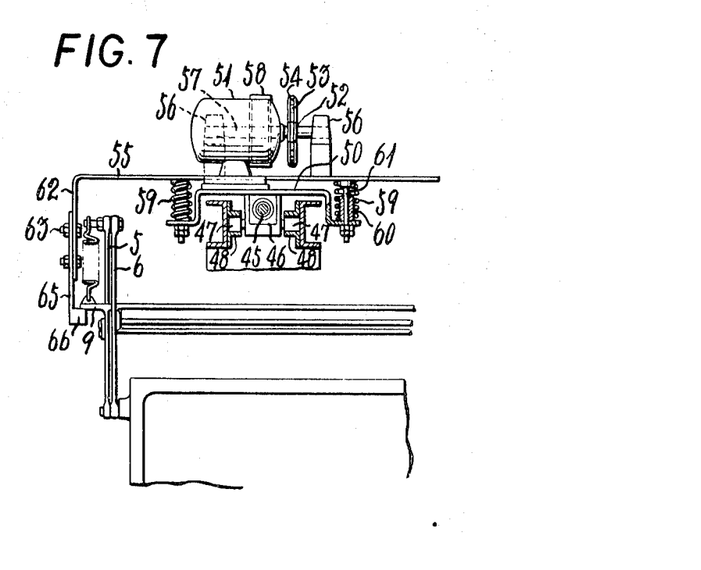
FIG. 7 is a vertical sectional side elevation of a modified embodiment.
Figure 8:
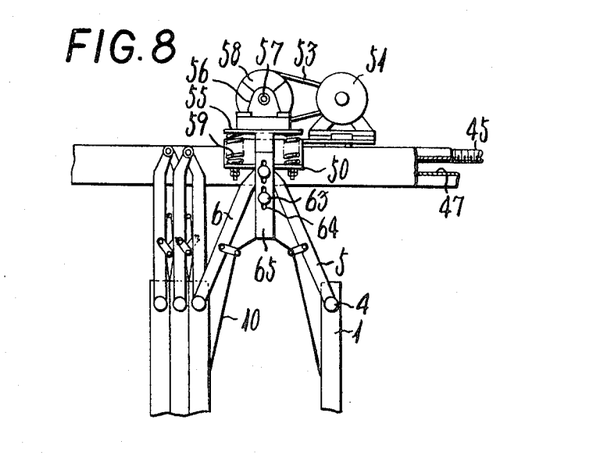
FIG. 8 is a front view.
Figure 9:
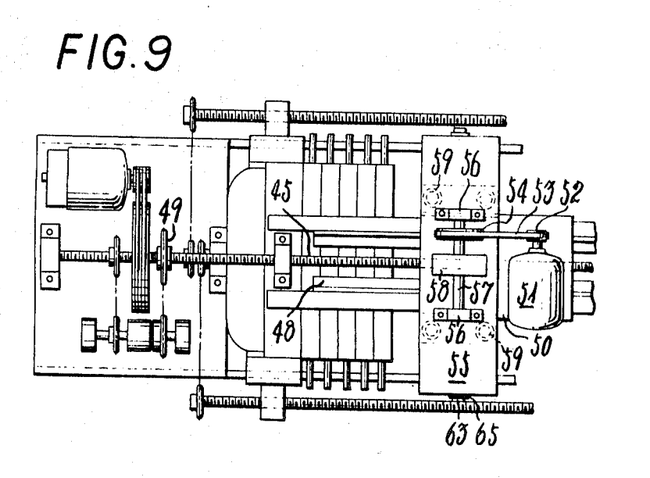
FIG. 9 is a plan view showing a driving unit.

FIGS. 7 to 9 illustrate an embodiment in which the counteraction of spring is utilized in a vibrator for effecting upward and downward vibration of the filter cloth. A movable member 46 is mounted on a guide screw 45 in screw-thread engagement therewith which is supported on right and left frames (not shown) along the direction of the travel of the filter plates 1. The movable member 46 is provided with rollers 47 on opposite sides thereof which are fitted in the grooves of guide rails 48 horizontally disposed between and on the frames. To the upper portion of the movable member 46 is attached a supporting plate 50 on which is fixedly mounted a compact motor 51. By means of a pulley 52, belt 53 and pulley 54, the rotation of the motor is delivered to a shaft 57 supported on brackets 56 on a vibrating plate 55 which extends transversely of the filter cloth. An eccentric body 58 is fixed to the shaft. Between the supporting plate 50 and vibrating plate 55 are disposed four coil springs 59 with equal distance apart from the front and back and from the both sides of the eccentric body 58. Numeral 60 indicates bushes of the coil springs 59; 61, shafts for moving them up and down.

The opposite ends of the vibrating plate 55 are provided with vertical leg members 62 which are disposed outside the links 5 and 6 connecting the filter plates, and the leg members 62 are adjustably fitted with second leg members 65 by means of bolts 63 and slots 64. The bent portions 66 formed at the lower ends of the second members 65 are positioned under the rod 9 from which the filter cloth 10 hangs.

By rotating the guide screw 45 by a driving unit by means of a chain wheel 49 shown in FIG. 9 while the filter plate is in transit as illustrated in FIG. 8, the movable member 46 is sent forward. The movements of the automatic filter-plate-moving apparatus and of the movable member 46 by the guide screw 45 are so adjusted that the bent portions 66 of the leg members 65 on the vibrating plate may be positioned exactly below the suspended rod 9 on which the filter cloth 10 is hung in an inverted V-form between a filter plate which has been moved and another filter plate to be moved next.

The vibrating plate 55 is brought into upward and downward vibration by the eccentric body 58 thereon which is rotated by a motor 51 on the support plate 50. This vibration, being assisted by each of the coil springs 59, is delivered to the rod 9 through the bent portions 66 of the leg members 65 of the vibrating plate 55 to give vibration to the filter cloth through the rod 9 and thereby satisfactorily shake the highly viscous cake from the cloth.

Figure 10:
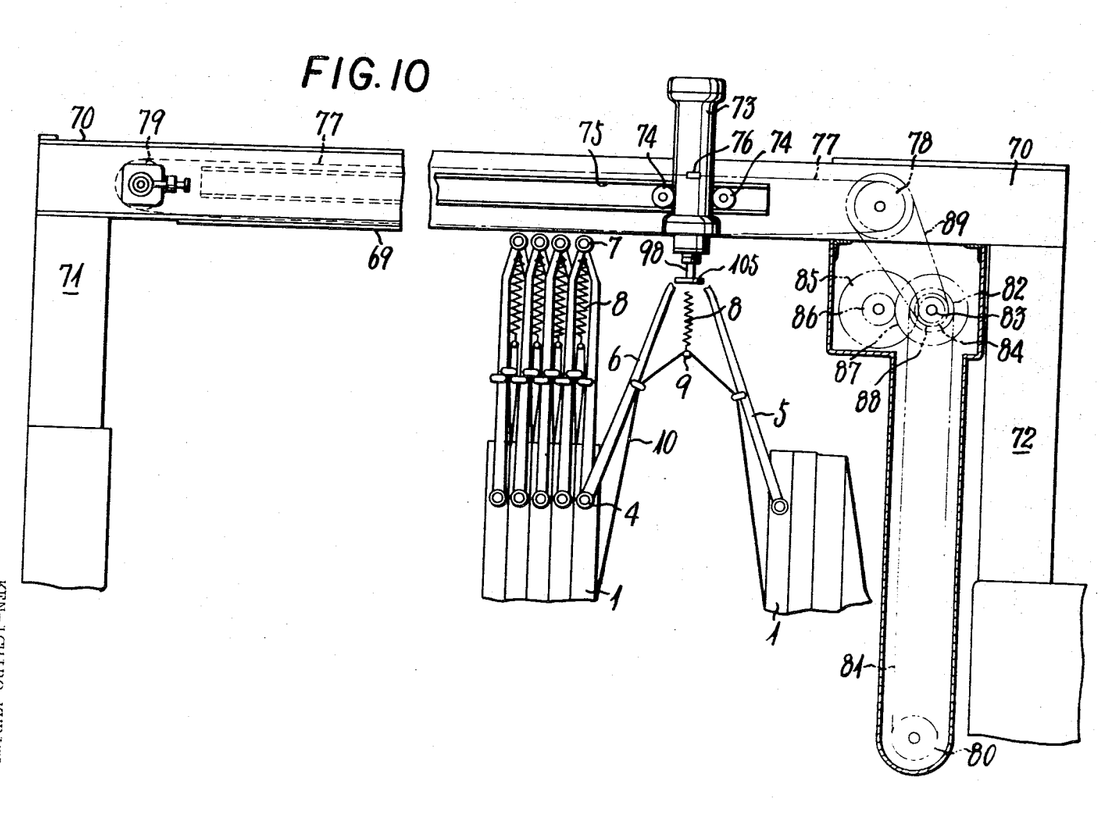
FIG. 10 is a front view showing another embodiment with part omitted.

An embodiment shown in FIGS. 10 to 13 utilizes a filter cloth vibrator which is driven by compressed air. Within a beam 70 supported on frames 71 and 72 along the direction of travel of the filter plates are extending rails 75 and 75 for holding the upper and lower portions of four rollers 74 at opposite ends of shafts 68 which are received by brackets 67 provided in the trunk of the main body 73 of the vibrator. To a coupling member 76 formed in the trunk of the main body 73 of the vibrator are connected the opposite ends of a chain 77. ONe portion of the chains 77 is reeved around a chain wheel 78 supported on a beam 70 at a position proximate to the frame 72, while the other is reeved around a chain wheel 79 whose shaft is supported on a beam above the frame 71 on the opposite side. By driving the chain wheel 78, the main body 73 of the vibrator is moved to above the suspended rod 9 on which the filter cloth 10 is hung in an inverted V-form between the traveling filter plate and the remaining filter plate. An intermediate shaft 80 of the automatic filter-plate-moving apparatus moves a chain wheel 82 by means of a chain 81 and a gear 84 mounted on a shaft 83 of the wheel 82 further transmits the torque to gears 85, 86 and 87 and to a chain wheel 88 of an electromagnetic switch (not shown), and through a chain 89 the chain wheel 78 is driven as shown in FIG. 10.

In order to prevent the chain 77 connected to the vibrator from being drooping between the chain wheels 78 and 79, the chain is adapted to be moved on a receiving plate 69 attached to the lower portion of the beam 70.

Figure 11:
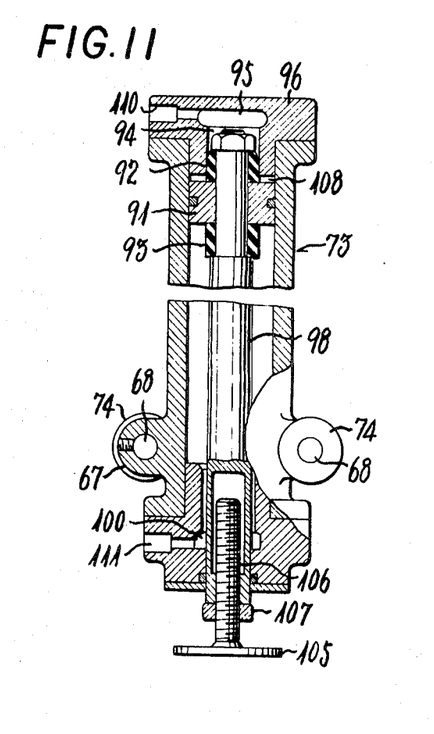
FIGS. 11 and 12 are a front view in vertical section and a vertical sectional side elevation showing a vibrator of the same.
Figure 12:
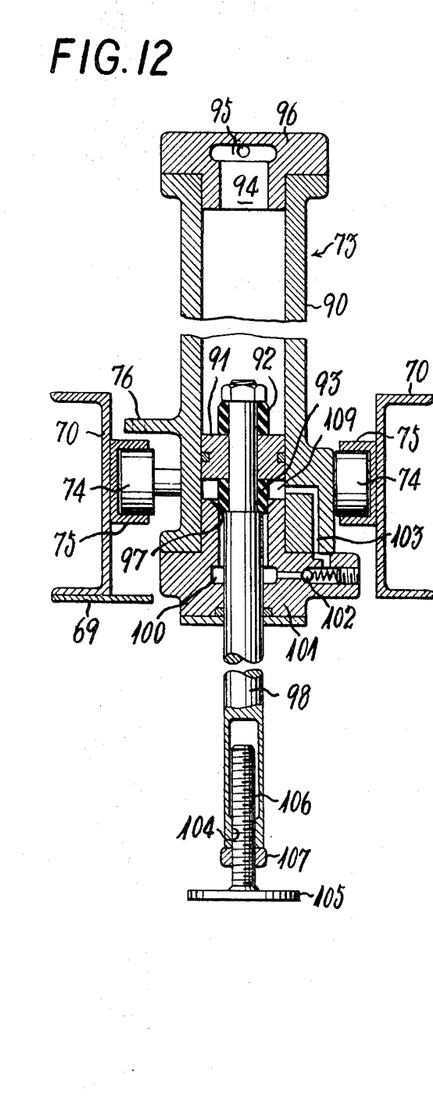
Figure 13:
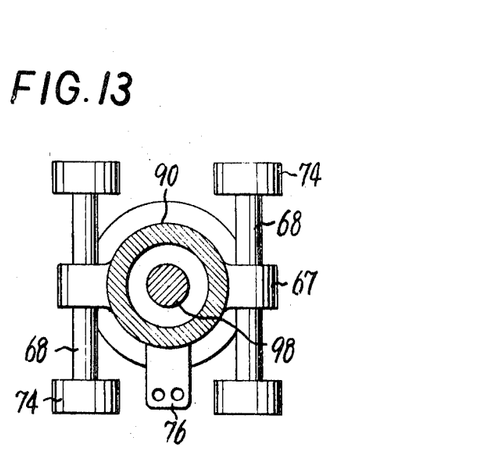
FIG. 13 is a cross-sectional plan view.

FIGS. 11 to 13 show the details of the vibrator main body 73. A piston 91 inserted in a cylinder 90 is provided at the upper and lower portions with cushion pieces 92 and 93 of resilient material such as rubber. A cylindrical space 94 for receiving a portion of the cushion piece is formed and an upper cover 96 of the cylinder having an air inlet 95 in communication with the space is mounted on the upper portion of the cylinder. The lower opening of the cylinder is formed with a cylindrical portion 97 for receiving the lower cushion piece 93 on the piston 91 and provided with a lower cover 101 having a hole 99 for passing a piston rod 98 and an air storage chamber 100. Further as shown in FIG. 12, extending from the lower air storage chamber 100 is a bypath 103 having check valve 102 in the lowest portion of the cylinder. In the lower end of the piston rod 98, there is formed a screw hole 104 into which a shaft 106 of the vibrating member 105 is screwed. The position to which the shaft 106 of the vibrating member 105 is to be locked is adjusted by means of an adjusting nut 107 at the lower end of the piston rod 98.

When compressed air is introduced into the lower space of the cylinder 90 as, for example, shown in FIG. 11, the piston 91 is located at an upper position within the cylinder with the cushion piece 92 received in the cylindrical space 94 in the cylinder cover 96, an enclosed space 108 thereby being formed by the inner end surface of the upper cylinder cover 96, inner wall of the cylinder and the piston 91. Thus the air compressed in the space serves as a cushion to prevent the piston 91 from directly striking against the cylinder cover 96. In the like manner, the lower enclosed space 109 acts as a cushion when the piston 91 is pushed down by the pressure of the air taken into the cylinder through the upper air inlet. In the case the piston fails to effect rapid upward movement because of the weight of its own and the small area of the lower cushion piece 93 which receives the air pressure, the bypath 103 extending from the lower air storage chamber 100 to the lower enclosed space 109 serves to send air therethrough up to the lower surface of the piston 91 to facilitate the upward travel.

The supply and exhaust of compressed air into and out of respective upper and lower air inlets 110 and 111 are effected by a switch valve which involves an electromagnetic valve. Since the vibrator main body is moved on the rails a flexible pipe is employed as a pipe to be attached to the cylinder. The flexible pipe is hung on a rail which is in parallel with the rails for the vibrator. The mode to provide this structure will not be described herein because already known means can readily be employed in practical use.

In accordance with the embodiment above, the vibrating member 105 delivers upward and downward vibration from above the middle portion of the suspended rod 9 to the filter cloth which is in an inverted V-shaped open position between a filter plate which has been moved toward the movable head and a next-positioned filter plate whereby the filter cake can be shaken from the cloth. In case this embodiment is employed, the filter cloth is not patted or struck but it is brought into vibration by means of the rod 9, hence the cloth is less susceptible to damage.

As described above, the present invention is advantageous in that the apparatus can give automatic and strong vibration to the filter cloth which is brought to an inverted V-shaped open position and removal of the cake can readily be carried out without a necessity of manual operation.

In view of the spirit of the present invention, the structure of the apparatus of the invention is not limited to the embodiments but it may be modified into various alterations. The filter-cloth-hanging structure is not limited to the embodiment and even in case the cloth is hung on more than one rod, the present invention can readily be applied.

I claim:

1. An apparatus for automatically shaking filter cake in a filter press having a plurality of filter plates mounted for opening movement in a first direction, a horizontal rod mounted above and between each pair of said filter plates and filter cloth folded over each of said rods to be positioned between said filter plates; said apparatus comprising a vibration supporting member mounted above said filter press, a vibrating means supported by said vibration supporting member for selectively imparting vibrating motion to each of said rods, and means for moving said vibration supporting member in a direction opposite to said first direction, said means for moving comprising a guide screw to be driven in operative relationship with a driving means for moving said filter plates and supported above said filter plates along the direction of the travel thereof, and said vibrating means comprising rotary shafts disposed in parallel with said guide screw and connected to said supporting means by means of links and cams mounted on said shafts, said cams being adapted to be moved only in the axial direction of said rotary shafts.

2. An apparatus for automatically shaking filter cake in a filter press having a plurality of filter plates mounted for opening movement in a first direction, a horizontal rod mounted above and between each pair of said filter plates and a filter cloth folded over each of said rods to be positioned between said filter plates; said apparatus comprising a vibration supporting member mounted above said filter press, a vibrating means supported by said vibration supporting member for selectively imparting vibrating motion to each of said rods, and means for moving said vibration supporting member in a direction opposite to said first direction, said means for moving comprising a guide screw to be driven in operative relationship with a driving means for moving said filter plates and supported above said filter plates along the direction of the travel thereof, said supporting member comprising a vibration box mounted in screw thread engagement on said guide screw, and said vibrating means comprising a rotary shaft extending through the lower half portion of said box in parallel with said guide screw, a cam being associated with said rotary shaft within said vibration box and adapted to be movable only in the axial direction, a hook member mounted on a portion of a shaft vertically extending through said vibration box being adapted to be engaged with said cam, a spring acting between said hook member and vibration box, a vibrating member being provided at the lower end of said shaft.

3. An apparatus for automatically shaking filter cake in a filter press having a plurality of filter plates mounted for opening movement in a first direction, a horizontal rod mounted above and between each pair of said filter plates and a filter cloth folded over each of said rods to be positioned between said filter plates; said apparatus comprising a vibration supporting member mounted above said filter press, a vibrating means supported by said vibration supporting member for selectively imparting vibrating motion to each of said rods, and means for moving said vibration supporting member in a direction opposite to said first direction, said means for moving comprising a guide screw to be driven in operative relationship with a driving means for moving said filter plates and supported above said filter plates along the direction of the travel thereof, and said vibrating means comprising a motor mounted on a supporting plate on a movable member in screw thread engagement therewith, an eccentric body mounted on a vibrating plate supported through springs on said supporting plate, said eccentric body being adapted to be driven by said motor by means of a belt, and said vibrating plate having legs, the lower parts of which having bent portions disposed under said rod for hanging the filter cloth.

4. An apparatus for automatically shaking filter cake in a filter press having a plurality of filter plates mounted for opening movement in a first direction, a horizontal rod mounted above and between each pair of said filter plates and a filter cloth folded over each of said rods to be positioned between said filter plates; said apparatus comprising a vibration supporting member mounted above said filter press, a vibrating means supported by said vibration supporting member for selectively imparting vibrating motion to each of said rods, and means for moving said vibration supporting member in a direction opposite to said first direction, said vibrating means comprising a vibrator main body supported above said filter plates on rails and connected to a chain driven in operative relationship with a driving means for moving the filter plates, said vibrator main body comprising a cylinder having upper and lower air inlets, a piston positioned within said cylinder and vibrating member adjustably attached to the lower end of said piston.

5. The apparatus as claimed in claim 4 wherein said vibrator main body further comprises four rollers provided in the trunk of said cylinder and supported on two grooved rails.

6. The apparatus as claimed in claim 4 wherein said vibrator main body further comprises cushion members small in diameter and made of a resilient materiallike rubber provided on and beneath said piston, and upper and lower cylinder covers provided with cylindrical portions for receiving said cushion members, said air inlets being formed in said cylinder covers.

* * * * *